United States Patent
Fujiwara et al.

[11] Patent Number: 6,095,301
[45] Date of Patent: Aug. 1, 2000

[54] PULLEY UNIT

[75] Inventors: Hideki Fujiwara, Osaka; Yasuhito Tanaka, Nara; Yoshitaka Nakagawa, Osaka; Hajime Tazumi, Osaka; Junya Ooitsu, Osaka, all of Japan

[73] Assignee: Koyo Seiko Co., Ltd., Osaka, Japan

[21] Appl. No.: 09/158,158

[22] Filed: Sep. 22, 1998

[30] Foreign Application Priority Data

Sep. 24, 1997 [JP] Japan .................................. P9-258300
Feb. 5, 1998 [JP] Japan .................................. P10-024303

[51] Int. Cl.[7] ................................................. F16D 41/067
[52] U.S. Cl. ........................................ 192/45; 192/110 B
[58] Field of Search ................................... 192/45, 41 R, 192/45.1, 110 B

[56] References Cited

U.S. PATENT DOCUMENTS

| 5,358,456 | 10/1994 | Deppert et al. . | |
|---|---|---|---|
| 5,433,305 | 7/1995 | Takamatsu et al. | 192/45 |
| 5,517,957 | 5/1996 | Wagner et al. . | |
| 5,642,796 | 7/1997 | Tabe | 192/45 X |
| 5,672,110 | 9/1997 | Kurita | 192/45 X |
| 5,675,202 | 10/1997 | Zenmei et al. | 192/45 X |
| 5,908,094 | 6/1999 | Le-Calve | 192/41 R |

FOREIGN PATENT DOCUMENTS

P7-317807  12/1995  Japan .
2 086 495   5/1982  United Kingdom .

OTHER PUBLICATIONS

JP 10213207 (Abstract and Figure) (Aug. 11, 1998).

*Primary Examiner*—Charles A. Marmor
*Assistant Examiner*—Saúl J. Rodríguez
*Attorney, Agent, or Firm*—Jacobson, Price, Holman & Stern, PLLC

[57] ABSTRACT

A pulley unit comprising two inner and outer annular bodies disposed coaxially and a one-way clutch interposed in an annular space between both the annular bodies, both ends in the axial direction of the annular space being sealed by a seal and at least the sealed portion of at least one seal being hidden by an annular member mounted to the inner annular body. By this structure, the sealed portion by the seal is protected from a direct splash of water, so that invasion of water through the sealed portion becomes unlikely to occur.

21 Claims, 7 Drawing Sheets

PULLEY UNIT

BACKGROUND OF THE INVENTION

1. Field of the Invention

The present invention relates to a pulley unit having a one-way clutch. This pulley unit can be provided in, for example, an auxiliary machine driven through a belt by a crank shaft of a vehicle engine. The auxiliary machine may include, for example, air conditioner compressor, water pump, alternator, cooling fan of a vehicle and the like.

2. Description of the Related Art

Various auxiliary machines mounted on a vehicle engine are driven through a belt by a crank shaft of its engine. In case of an alternator, for example, which is one of the auxiliary machines, if it is coupled with an engine crank shaft so as to rotate synchronously therewith, when the rotation speed of the crank shaft drops, power generation capacity of the alternator also drops.

Thus, the inventor of the present invention has considered that by incorporating the aforementioned one-way clutch in a pulley portion of the alternator, when the rotation speed of the crank shaft drops, the rotation of a rotor of the alternator is kept the same by its inertia force so as to intensify power generation efficiency.

In this case, the one-way clutch is interposed between the pulley of the alternator and rotor, and the one-way clutch is changed from a lock state (driving power transmitting state) to a free state (driving power transmission shut-down state) depending on a difference of the rotation between the pulley and rotor. Consequently, the driving power is transmitted or shut down between the pulley and rotor. On one side or both sides of the one-way clutch in an annular space between the pulley and rotor, a rolling bearing for bearing the load and smoothing a rotation of the rotor is provided.

Usually, a sealing member is mounted at an outer end of the aforementioned rolling bearing in the axial direction so as to seal the rolling bearing and one-way clutch from outside. This sealing member forms a non-contact type sealing portion in which an inner periphery or outer periphery opposes an inner or outer wheel of a rolling bearing, rotor or pulley via a minute gap or a contact type sealing portion in which the inner periphery or outer periphery contacts.

In the above described conventional example, because the non-contact type sealing portion or contact type sealing portion by the sealing member is exposed outside, if water is directly splashed over this sealing portion, water is likely to invade through this sealing portion.

To solve this problem, the inventor considered that, for example, a bottomed cylindrical lid was fit to an end portion of a free end of the pulley so as to hide the free end of the pulley from outside. Usually, the pulley is fixed to the auxiliary machine or driving shaft by a bolt and nut and the lid covers an entire end face of the pulley. Thus, when the pulley is installed, the installation of the pulley cannot be carried out until the lid is removed. Further when the pulley is removed, the removal of the pulley cannot be carried out until the lid is removed. Thus, these procedures are troublesome. Although the material of the lid can be synthetic resin so as to save cost, the expansion coefficient of the lid is larger than that of the pulley so that the lid come to slip out easily of the pulley with a generation of heat in the pulley.

SUMMARY OF THE INVENTION

Accordingly, a primary object of the present invention is to provide a pulley unit capable of intensifying the sealing performance of a space for aligning a one-way clutch.

Another object of the present invention is to provide a pulley unit having a structure in which a sealing member protecting member does not obstruct mounting and removal procedures of the pulley unit.

Still another object of the present invention is to provide a pulley unit capable of preventing a slip-out of the sealing member protecting member.

Other objects, features and advantages of the present invention will be apparent from a following description.

To achieve the above object, the present invention provides a pulley unit comprising an inner annular body, an outer annular body disposed coaxially with the inner annular body, a one-way clutch interposed in an annular space between the inner annular body and the outer annular body and brought into a lock state or free state depending on a difference of rotation speed between the inner annular body and the outer annular body so as to transmit a driving power between both the annular bodies and shut down the transmission of the driving power, a bearing interposed in the annular space and disposed on at least one side in the axial direction of the one-way clutch, a sealing member for sealing the annular space; and an annular member for hiding the sealing member from outside.

Preferably, the annular member is installed on the inner annular body.

Preferably, the bearing is a rolling bearing.

Preferably, the sealing member is provided on a side of an outer end in the axial direction between an inner wheel and an outer wheel of the rolling bearing.

Preferably, the annular member is disposed so as to oppose the sealing member via a minute gap in the axial direction.

Preferably, the annular member contains a cylindrical portion to be fit to an inner peripheral face of the inner annular body and the annular member is fixed to the inner annular body by pressing in the cylindrical portion so that it is fit to the inner peripheral face of the inner annular body.

Preferably, the inner annular body has a large diameter bolt insertion hole located in a center thereof and outside in the axial direction and a small diameter bolt insertion hole located inside thereof in the axial direction.

Preferably, the annular member contains a cylindrical portion to be fit into the large diameter bolt insertion hole of the inner annular body and an annular portion extending from an outer end in the axial direction of the cylindrical portion outward in the diameter direction, wherein the annular portion extending outward in the diameter direction is disposed so as to oppose the sealing member via a minute gap in the axial direction.

Preferably, the annular member contains an annular portion extending from an inner end in the axial direction of the cylindrical portion inward in the diameter direction and both the bolt insertion holes pass through the annular portion directing inward in the diameter direction, the annular member being nipped in the axial direction between the head of a bolt bolted to a rotation shaft for which the pulley unit is used and a step wall face formed by both the bolt insertion holes of the inner annular body.

In the pulley unit of the present invention, the sealing member for sealing the annular space containing the one-way clutch is protected from a direct splash of water. Consequently, invasion of water through the sealing member becomes unlikely to occur. Because of the annular member, the bolt or the like for fixing the inner annular body to an application object is exposed from a center hole of the annular member, so that fitting and removal of this bolt is facilitated.

In case when an application object is a vehicle, considering that only the free end of the pulley unit is likely to be wet with water, the annular member is provided only on the free end. Thus, there is no waste of part.

Because in the pulley unit of the present invention, the annular member hides the sealing member so as to form a non-contact type sealing portion of a minute gap between the annular member and sealing member, invasion of water into the sealing member can be prevented securely.

Because in the pulley unit of the present invention, the cylindrical portion of the annular member is fit to the inner periphery of the inner annular body, fitting performance between the inner annular body and annular member is likely to increase by a generation of heat in the inner annular body, so that the annular member becomes hard to slip out.

Because in the pulley unit of the present invention, the annular portion directing inward in the diameter direction of the annular member is fixed to the inner periphery of the inner annular body by tightening a bolt, the annular member never drop out even if each part is heated.

BRIEF DESCRIPTION OF THE DRAWINGS

These and other objects as well as advantages of the invention will become clear by the following description of preferred embodiments of the invention with reference to the accompanying drawings, wherein.

In all these figures, like components are indicated by the same numerals.

DETAILED DESCRIPTION OF THE PREFERRED EMBODIMENTS

Hereinafter, a preferred embodiment of the present invention will be described with reference to the accompanying drawings.

A pulley unit according to a preferred embodiment of the present invention will be described with reference to FIGS. 1 and 2.

The pulley unit shown in the same Figures comprises an outer annular body 1 and an inner annular body 2. The outer annular body 1 and inner annular body 2 are disposed coaxially. A roller bearing 4 is disposed in the aforementioned annular space and on each of both sides in the axial direction of a one-way clutch 3. The one-way clutch 3 is locked depending on a difference of rotation speed between the outer annular body 1 and inner annular body 2 so as to transmit a driving power from the outer annular body 1 to the inner annular body 2, and when it is free, the transmission of the driving power is shut down. When the one-way clutch 3 is free, the inner annular body 2 continues to rotate by its rotation inertia force.

The outer annular body 1 has wave-like grooves on an outer periphery thereof and is rotated by a belt 8 (e.g., belt driven by a crank shaft of a vehicle engine) which is wound around the wave-like grooves. The inner annular body 2 contains a bolt insertion hole 21 provided in the center thereof. A large diameter portion 22 is provided on one opening of this bolt insertion hole 21. The inner annular body 2 is bolted to an end face of a driving shaft 61 (e.g., rotor of an alternator) of an auxiliary machine 6 of a vehicle by a bolt 5 inserted from the side of the large diameter portion 22.

The one-way clutch 3 comprises an inner wheel 31, an outer wheel 32 in which cam faces 32a are provided at plural positions along the circumference of an inner peripheral surface thereof, a holding device 33 containing pockets 33a formed so as to go through from inside to outside in the diameter direction corresponding to each of the cam faces 32a, a plurality of rollers 34 contained in each of the pockets 33a of the holding device 33, and elastic members 35 like a leaf spring for urging the aforementioned roller 34 contained in each of the pockets 33a of the holding device 33 to a narrow side (lock side) of a wedge-like space formed by the cam face 32a and an outer face 31a of the inner wheel 31.

The rolling bearing 4 is a general angular type ball bearing containing an inner wheel 41, an outer wheel 42, a plurality of balls 43 and a holding device 44. A sealing member 45 is mounted only on an outer end in the axial direction between the inner wheel 41 and outer wheel 42. This sealing member 45 seals an annular space in which the rolling bearing and one-way clutch 3 are disposed.

An annular member 7 is mounted on a free end of the pulley unit according to this embodiment. The sealing member 45 is hidden from outside by this annular member 7.

The annular member 7 contains a cylindrical portion 71, an annular portion 72 which is an end in the axial direction of the cylindrical portion 71 and faces outward in the axial direction and an annular portion 73 which is the other end in the axial direction of the cylindrical portion 71 and faces inward in the axial direction. The annular member 7 is formed of, for example, metal like steel or synthetic resin. The annular member 7 is mounted by pressing the cylindrical portion 71 thereof into the large diameter portion 22 of the inner annular body 2. In this mounting condition, the annular portion 73 is in contact with a step wall surface between a small diameter bolt insertion hole 21 of the inner annular body 2 and the large diameter portion 22. An inside face of the annular portion 72 is disposed so as to oppose the sealing member 45 through a minute gap. An outer edge of the annular portion 72 is disposed in the vicinity of the outer wheel 42 of the rolling bearing 4.

Because the sealing member 45 is hidden from outside by the annular portion 72, no water is directly splashed over the sealing member 45. A non-contact sealing portion called labyrinth seal is formed between the annular portion 72 and sealing member 45 and between the rolling bearing 4 and outer wheel 42. As a result, the aforementioned annular space in which the one-way clutch 3 and bearings 4, 4 are disposed is highly sealed.

Because the annular member 7 is held unseparately from the pulley unit, this can be handled integrally with the pulley unit. If the bolt 5 is inserted through the bolt insertion hole 22 of the inner annular body 2 and a center hole in the annular portion 73 directing inward in the diameter direction of the annular member 7 and bolted to an end face of the driving shaft 61 of the auxiliary machine 6 so that the pulley unit itself is fixed to the auxiliary machine 6, the annular member 7 is brought into a condition completely not-separated from the pulley unit. As a result, even if heat is generated in the inner annular body 2 of the pulley unit, the annular member 7 never slips out of the pulley unit. Because the bolt 5 is not hidden by the annular member 7, the bolt 5 can be loosened so that the pulley unit can be removed easily from the auxiliary machine 6.

This annular member 7 is capable of protecting the space accommodating the one-way clutch 3 and rolling bearing 4 from invasion of water or the like. The annular member 7 never drops unexpectedly upon use. The annular member 7 is not an obstacle upon removing the bolt 5 for attaching or detaching the pulley unit. Even if water invades into a gap between the annular portion 72 and sealing member 45, water is discharged because it drops from its lower half and during a rotation, it is discharged by centrifugal force.

If this pulley unit is used for the auxiliary machine 6 of a vehicle, generally, a fixing end of the pulley unit is often disposed in the vicinity of a case of the auxiliary machine 6. Therefore, the aforementioned annular member 7 is not needed on the fixing end of the pulley unit. In case when the fixing end of the pulley unit is not disposed in the vicinity of the case of the auxiliary machine 6, it is desirable to mount the annular member 7 also at the fixing end of the pulley unit.

The present invention is not restricted to the above embodiment.

In the above embodiment, although the annular member 7 is fixed to the pulley unit by bolting the annular portion 73 to the pulley unit, it is permissible to eliminate the annular portion 73 from the annular member 7 and then press the cylindrical portion 71 into an inner peripheral face of the inner annular body 2 so as to fix the pulley unit.

Figure 3:
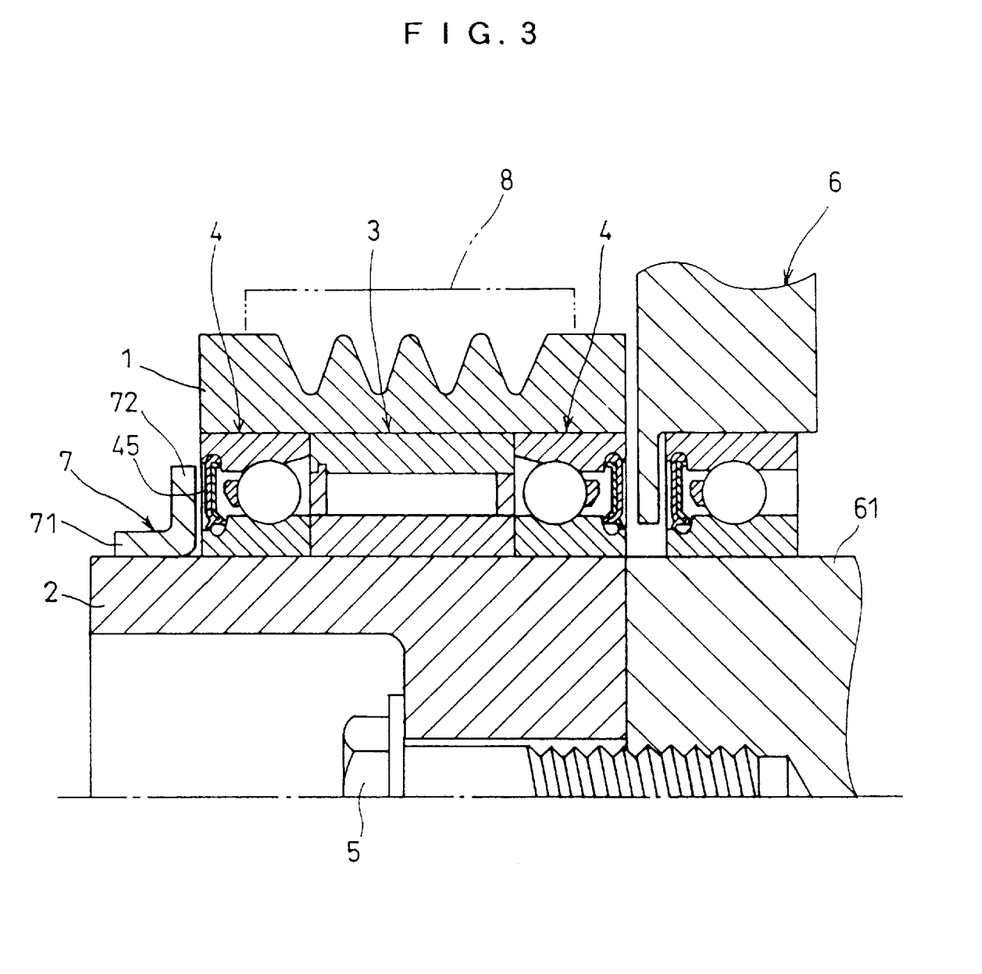
FIG. 3 is a longitudinal sectional view showing another embodiment of the annular member provided in the pulley unit of the present invention.

Also as shown in FIG. 3, it is permissible to extend a free end of the inner annular body 2 beyond a free end of the outer annular body 1 in the axial direction and press the annular member 7 so as to fit to the extending free end of the inner annular body 2 and fix it to the pulley unit. The annular member 7 shown in FIG. 3 comprises a cylindrical portion 71 and an annular portion 72 extending outward in the diameter direction from an end in the axial direction. With such a annular member 7 also, it is possible to obtain substantially the same operation and effect as the above described annular member 7. Further, as shown in FIGS. 4–6, the shape of the annular member 7 is arbitrarily determined.

Figure 4:
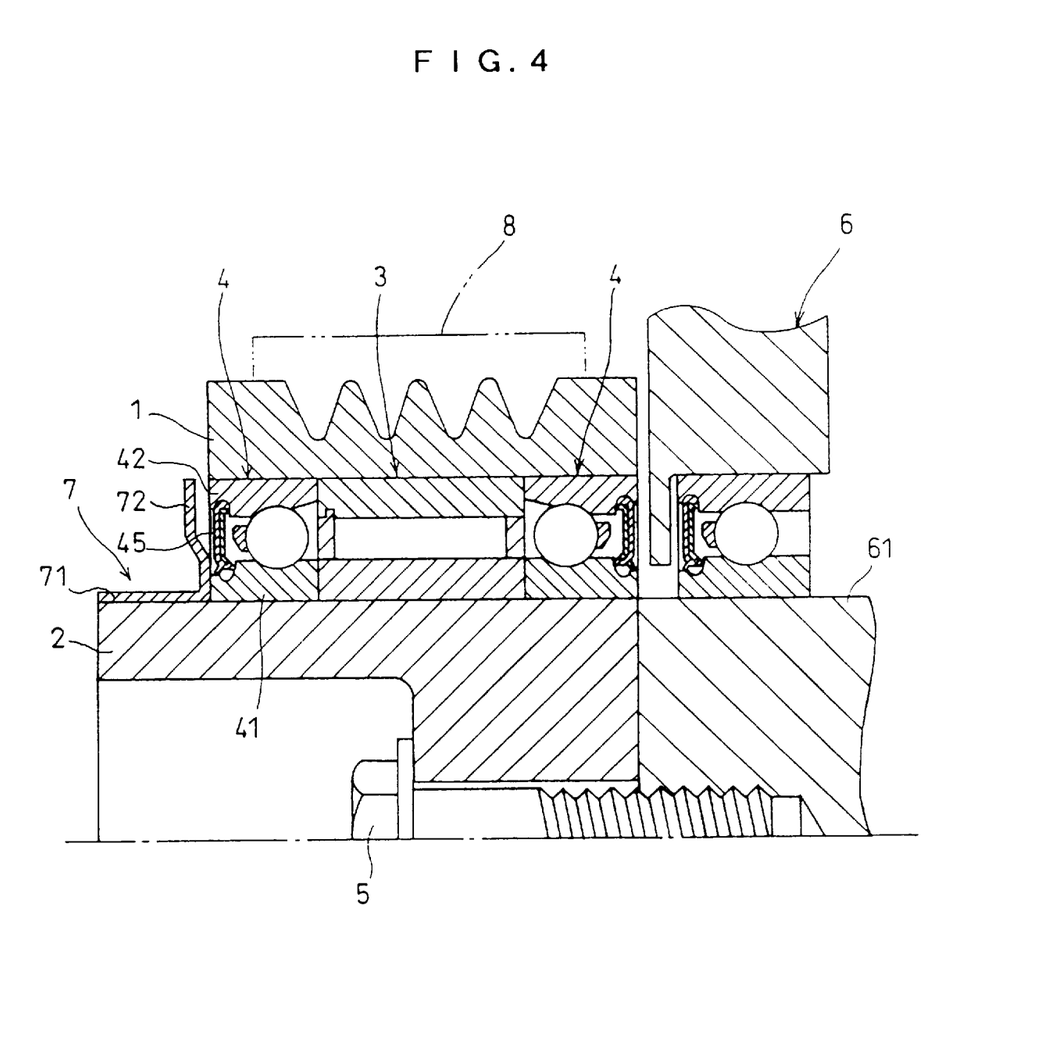
FIG. 4 is a longitudinal sectional view showing still another embodiment of the annular member provided in the pulley unit of the present invention.

In the annular member 7 shown in FIG. 4, the annular portion 72 is stepped and the annular portion 72 opposes the sealing member 45 as well as the outer wheel 42 via a minute gap. In this case, when the annular member 7 is mounted on the inner annular body 2, only by pressing the annular member 7 until it comes into contact with the inner wheel 41 of the rolling bearing 4, it is possible to set a gap between an outer portion of the annular portion 72 and the sealing member 45 and outer wheel 42 of the rolling bearing 4 to be constant.

Figure 5:
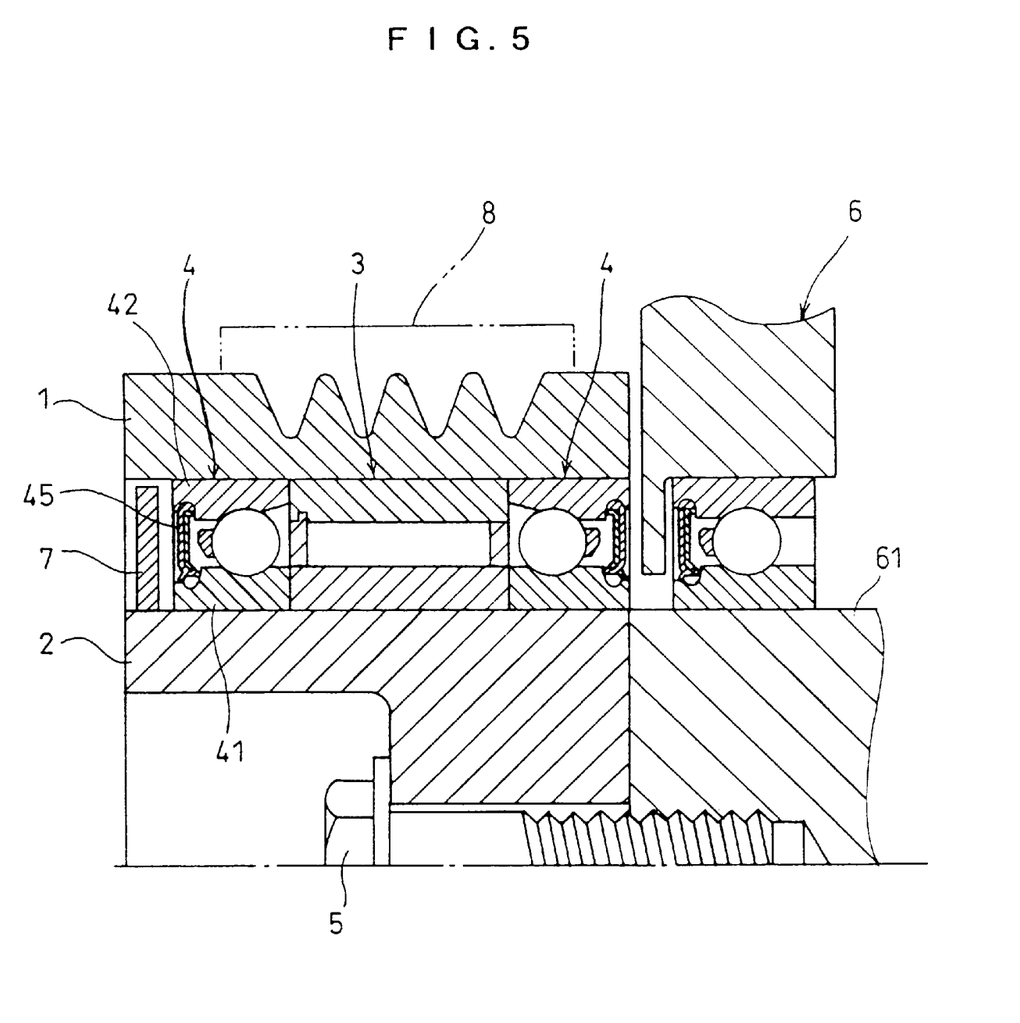
FIG. 5 is a longitudinal sectional view showing a further embodiment of the annular member provided in the pulley unit of the present invention.

The annular member 7 shown in FIG. 5 is an annular plate and by extending a free end of the outer annular body 1, a non-contact sealing portion including a minute gap is formed between an inner peripheral surface of the extending portion and an outer peripheral face of the annular member 7 which is an annular plate.

Figure 6:
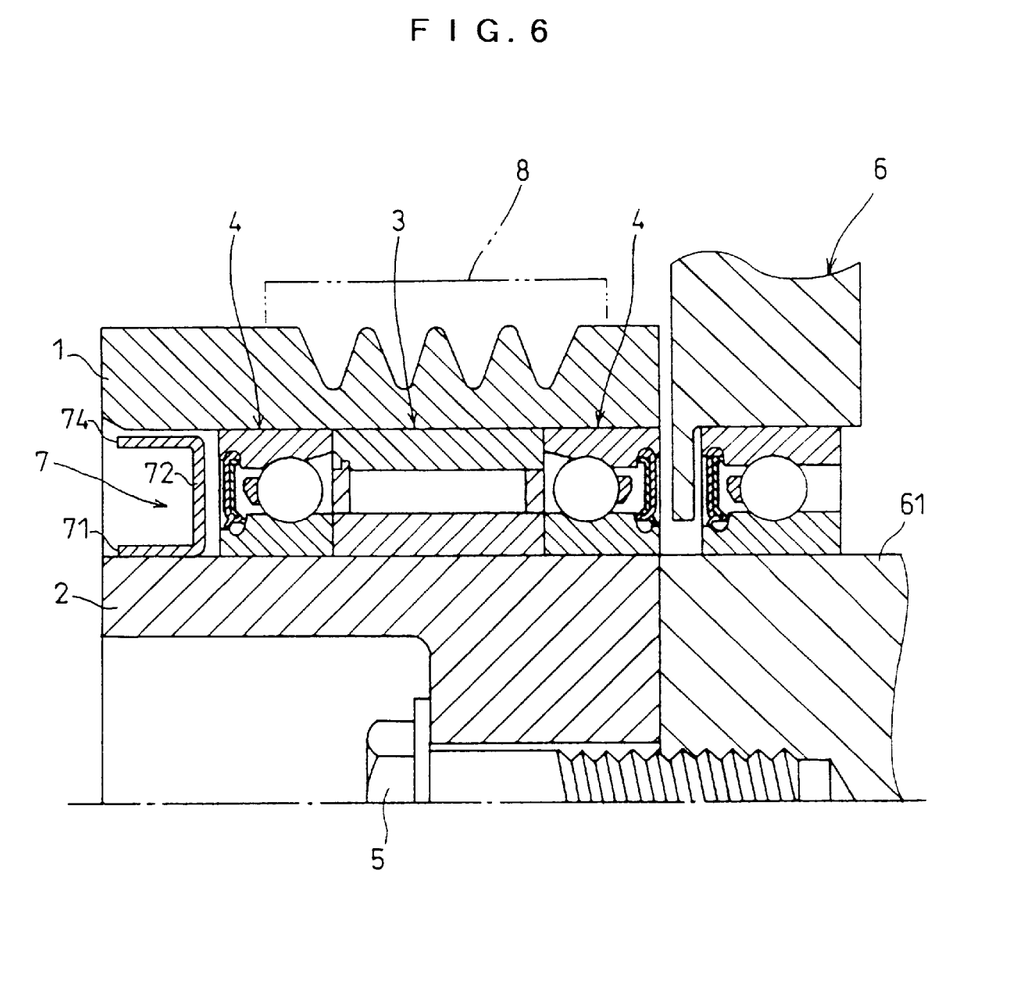
FIG. 6 is a longitudinal sectional view showing a still further embodiment of the annular member provided in the pulley unit of the present invention.

The annular member 7 shown in FIG. 6 is U-shaped as viewed from the side and by extending a free end of the outer annular body 1, a non-contact sealing portion including a minute gap is formed between the inner peripheral face of the extending portion and an outer cylindrical portion 74 of the annular member 7.

Figure 1:
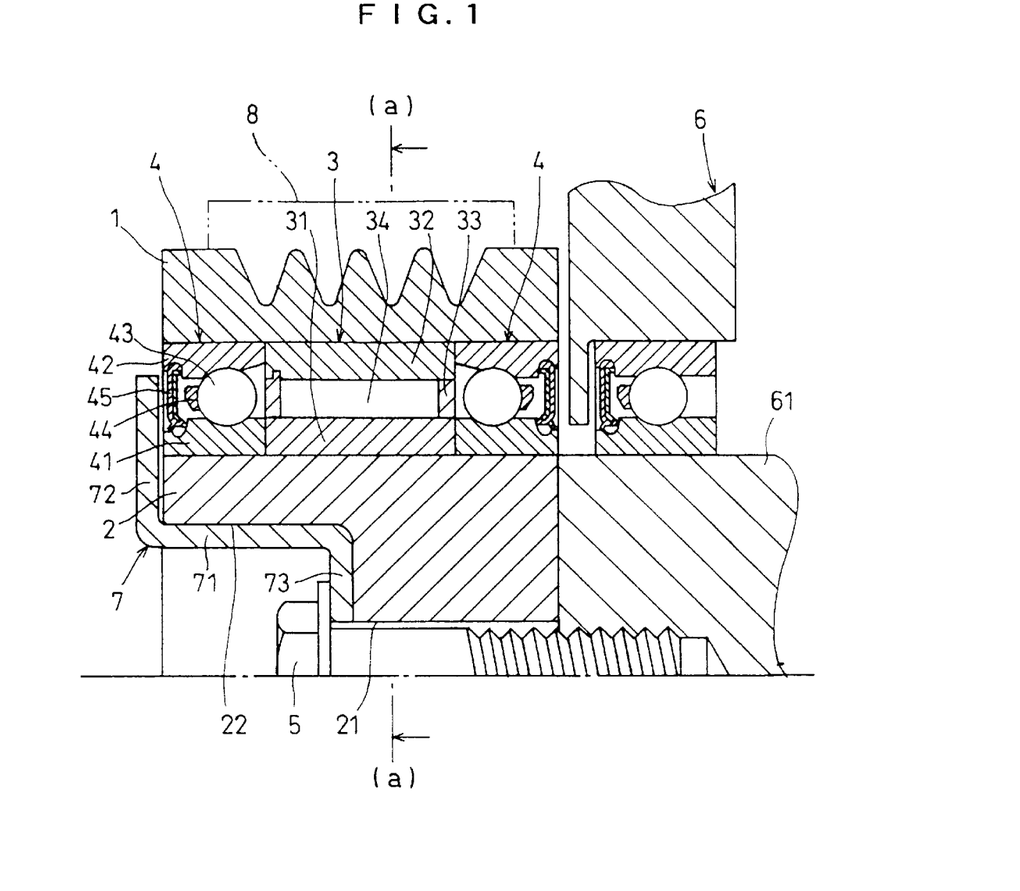
FIG. 1 is a longitudinal sectional view of a pulley unit according to a preferred embodiment of the present invention.
Figure 2:
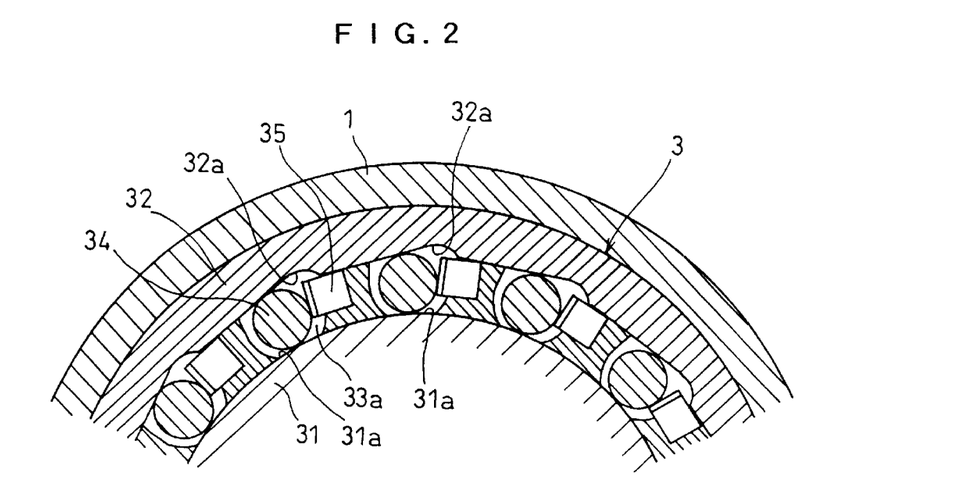
FIG. 2 is a sectional view taken by the line (a)—(a) of FIG. 1.

The present invention is not only applied to the pulley unit shown in FIG. 1 but also can be applied to other pulley units having various structures. For example, structures shown in FIGS. 7–10 are possible.

Figure 7:
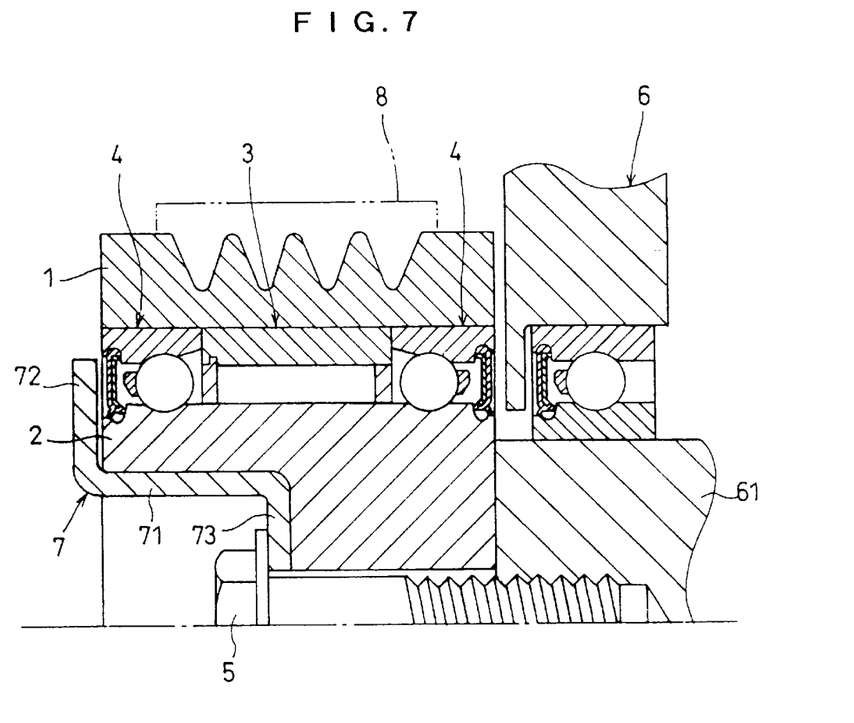
FIG. 7 is a longitudinal sectional view of a pulley unit according to a still further preferred embodiment of the present invention.

In a pulley unit according to another preferred embodiments of the present invention shown in FIG. 7, the inner wheels of the one-way clutch 3 and rolling bearings 4, 4 serve as the inner annular body 2 at the same time. In this case, the annular member 7 is mounted in the same manner as FIG. 1.

Figure 8:
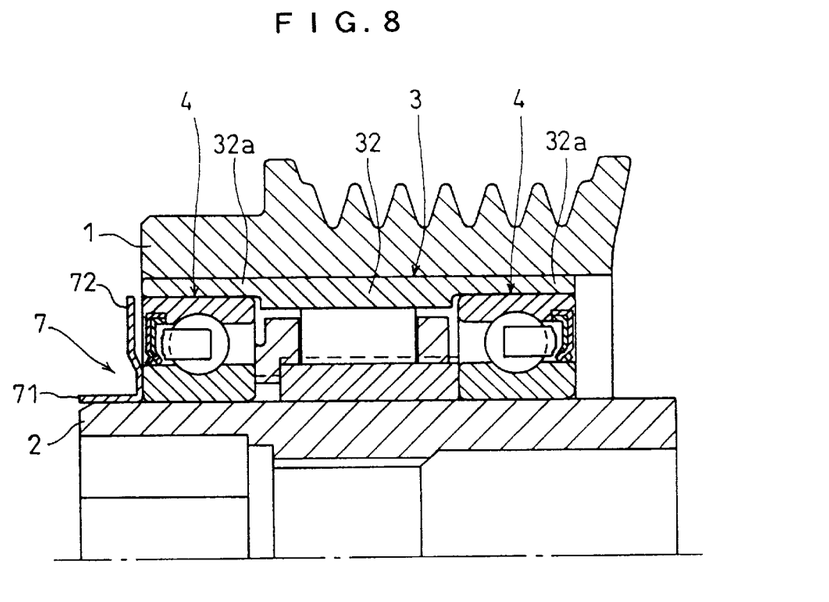
FIG. 8 is a longitudinal sectional view of a pulley unit according to a still further preferred embodiment of the present invention.

A pulley unit according to still another preferred embodiment of the present invention shown in FIG. 8 has such features that as compared to the pulley unit shown in FIG. 1, belt applying grooves of the outer annular body 1 are provided near one side of the pulley unit mounting side (right in the same Figure); the outer wheel 32 of the one-way clutch 3 is extended to both sides in the axial direction and the rolling bearings 4, 4 are mounted at extending portions 32a, 32a; the pulley unit mounting free ends (left in the same Figure) of the outer annular body 1 and inner annular body 2 are extended; and the annular member 7 shown in FIG. 5 is used.

Figure 9:
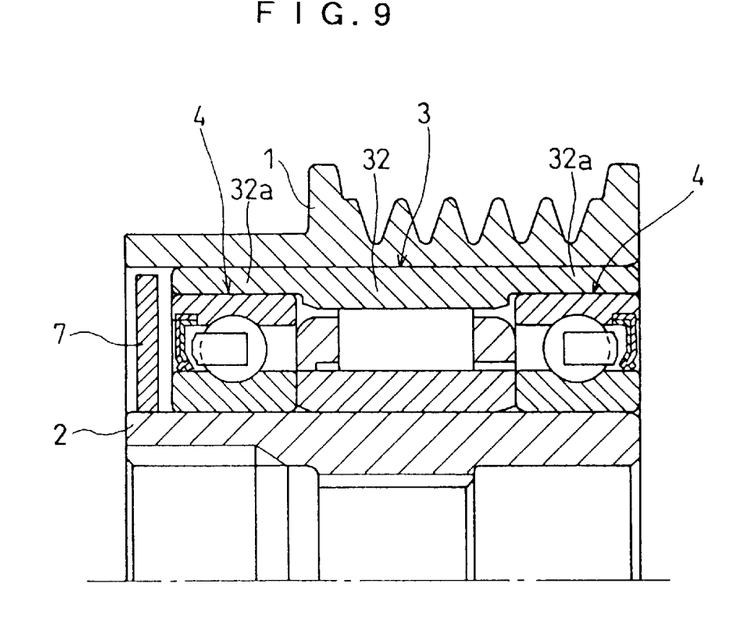
FIG. 9 is a longitudinal sectional view of a pulley unit according to a still further preferred embodiment of the present invention.

A pulley unit according to a further preferred embodiment of the present invention shown in FIG. 9 has such features that as compared to the pulley unit of FIG. 8, the free end of the outer annular body 1 is extended and the annular member 7 shown in FIG. 4 is used.

Figure 10:
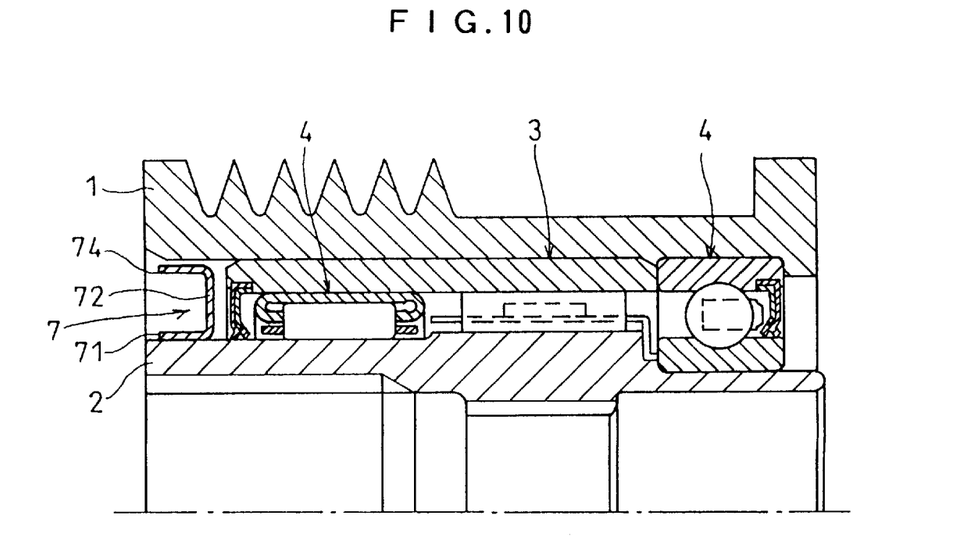
FIG. 10 is a longitudinal sectional view of a pulley unit according to a still further preferred embodiment of the present invention.

A pulley unit according to a still further preferred embodiment of the present invention shown in FIG. 10 has such features that as compared to the pulley unit shown in FIG. 8, the belt applying grooves of the outer annular body 1 are provided near a free end (left in the same Figure); needle bearings are used instead of the rolling bearing 4 of one side; the inner wheel of the one-way clutch 3 is integral with the inner annular body 2 and the annular member 7 shown in FIG. 6 is used.

In the above respective embodiments, although the leaf spring is exemplified as the elastic member 35 of the one-way clutch 3, an elastic piece formed integrally with the holding device 33 or coil spring can substitute for this.

In the above respective embodiments, although an example in which the cam faces 32a of the one-way clutch 3 are formed on a side of the outer wheel 32, the present invention can be applied to an example in which the cam faces 32a are formed on a side of the inner wheel 31. The structure in which the cam faces 32a are formed on the side of the inner wheel is suitable for use in high speed rotations because the rollers can be prevented from slipping out from the lock position by a centrifugal force even in a high-speed rotation range.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. A pulley unit comprising:

an inner annular body;

an outer annular body disposed coaxially with said inner annular body;

a one-way clutch interposed in an annular space between said inner annular body and said outer annular body and brought into a lock state or free state depending on a difference of rotation speed between said inner annular body and said outer annular body so as to transmit a driving power between both said annular bodies and shut down the transmission of the driving power;

a bearing interposed in said annular space and disposed on at least one side in the axial direction of said one-way clutch, said bearing being a rolling bearing;

a sealing member for sealing said annular space, said sealing member being provided on a side of an outer end in the axial direction between an inner wheel and an outer wheel of the rolling bearing; and an annular member for hiding said sealing member from outside, said annular member being installed on said inner annular body.

2. A pulley unit as claimed in claim 1 wherein said annular member is disposed so as to oppose said sealing member via a minute gap in the axial direction.

3. A pulley unit as claimed in claim 1 wherein said annular member contains a cylindrical portion to be fit to an inner peripheral face of said inner annular body and said annular member is fixed to said inner annular body by pressing in said cylindrical portion so that it is fit to the inner peripheral face of said inner annular body.

4. A pulley unit as claimed in claim 1 wherein said inner annular body has a large diameter bolt insertion hole located in a center thereof and outside in the axial direction and a small diameter bolt insertion hole located inside thereof in the axial direction.

5. A pulley unit as claimed in claim 1 wherein said annular member contains a cylindrical portion to be fit into a large diameter bolt insertion hole of said inner annular body and an annular portion extending from an outer end in the axial direction of said cylindrical portion outward in the diameter direction, wherein said annular portion extending outward in the diameter direction is disposed so as to oppose said sealing member via a minute gap in the axial direction.

6. A pulley unit as claimed in claim 5 wherein said annular member contains an annular portion extending from an inner end in the axial direction of said cylindrical portion inward in the diameter direction and both said bolt insertion holes pass through said annular portion directing inward in the diameter direction, said annular member being nipped in the axial direction between the head of a bolt bolted to a rotation shaft for which the pulley unit is used and a step wall face formed by both said bolt insertion holes of said inner annular body.

7. A pulley unit as claimed in claim 6 wherein the annular portion directing outward in the diameter direction of said annular member opposes an outer end in the axial direction of said inner annular body and an outer end in the axial direction of said rolling bearing.

8. A pulley unit as claimed in claim 1 wherein said one-way clutch comprises, an inner wheel, an outer wheel having a plurality of cam faces provided on an inner peripheral face thereof, a holding device having a plurality of pockets corresponding to said cam faces, a plurality of rollers accommodated in each of the pockets of said holding device, and elastic members for pressing each of said rollers to a narrow side of a wedge like space formed by said cam face and an outer peripheral face of said inner wheel, wherein said rollers roll between a wide side and a narrow side of said wedge like space depending on a difference of rotation speed between said inner annular body and said outer annular body so that said one-way clutch is brought into said lock state or free state.

9. A pulley unit as claimed in claim 1 wherein said inner annular body has a free end extending in the axial direction and said annular member comprises an annular portion directing outward in the diameter direction opposing said sealing member via a minute gap in the axial direction and a cylindrical portion pressed to fit to an outer peripheral face of said free end of said inner annular body and fixed to said inner annular body.

10. A pulley unit as claimed in claim 9 wherein the annular portion directing outward in the diameter direction of said annular member is so shaped to have a step that an end portion in the diameter direction is deformed outward in the axial direction and opposes the outer wheel of said rolling bearing and said sealing member via a minute gap in the axial direction.

11. A pulley unit as claimed in claim 1 wherein said inner annular body and outer annular body each have a free end extending in the axial direction, said annular member being an annular plate, fixed on the outer peripheral face of said inner annular body and opposing said sealing member via a minute gap in the axial direction.

12. A pulley unit as claimed in claim 1 wherein said inner annular body and outer annular body each have a free end extending in the axial direction, said annular member being U shaped as viewed from the side, fixed on the outer peripheral face of the free end of said inner annular body and opposing said sealing member via a minute gap in the axial direction.

13. A pulley unit as claimed in claim 1 wherein an inner wheel of said rolling bearing is composed of said inner annular body.

14. A pulley unit as claimed in claim 1 wherein said outer wheel of said one-way clutch is extended to both sides in the axial direction and said rolling bearings are disposed between the inner peripheral face of said extending portion of said outer wheel and the outer peripheral face of said inner annular body.

15. A pulley unit as claimed in claim 14 wherein said inner annular body has a free end extending in the axial direction and said annular member comprises an annular portion directing outward in the diameter direction so as to oppose said sealing member via a minute gap, and a cylindrical portion pressed to fit to the outer peripheral face of said free end of said inner annular body and fixed to said inner annular body.

16. A pulley unit as claimed in claim 14 wherein said inner annular body and outer annular body each have a free end extending in the axial direction and said annular member is an annular plate, which is fixed on the outer peripheral face of said extending free end of said inner annular body and opposes said sealing member via a minute gap in the axial direction.

17. A pulley unit as claimed in claim 1 wherein said rolling bearings are disposed on both sides in the axial direction of said one-way clutch while one bearing is a rolling bearing and the other bearing is a needle bearing, and said sealing member is disposed at an outer end in the axial direction of said needle bearing.

18. A pulley unit as claimed in claim 17 wherein the inner wheels of said one-way clutch and said needle bearing are composed of said inner annular body.

19. A pulley unit comprising:

an inner annular body;

an outer annular body disposed coaxially with said inner annular body;

a one-way clutch interposed in an annular space between said inner annular body and said outer annular body and brought into a lock state or free state depending on a difference of rotation speed between said inner annular body and said outer annular body so as to transmit a driving power between both said annular bodies and shut down the transmission of the driving power;

a bearing interposed in said annular space and disposed on at least one side in the axial direction of said one-way clutch;

a sealing member for sealing said annular space; and an annular member for hiding said sealing member from outside, said annular member being disposed so as to oppose said sealing member via a minute gap in the axial direction.

20. A pulley unit comprising:

an inner annular body, said inner annular body having a large diameter bolt insertion hole located in a center thereof and outside in the axial direction and a small diameter bolt insertion hole located inside thereof in the axial direction;

an outer annular body disposed coaxially with said inner annular body;

a one-way clutch interposed in an annular space between said inner annular body and said outer annular body and brought into a lock state or free state depending on a difference of rotation speed between said inner annular body and said outer annular body so as to transmit a driving power between both said annular bodies and shut down the transmission of the driving power;

a bearing interposed in said annular space and disposed on at least one side in the axial direction of said one-way clutch;

a sealing member for sealing said annular space; and an annular member for hiding said sealing member from outside.

21. A pulley unit comprising:

an inner annular body;

an outer annular body disposed coaxially with said inner annular body;

a one-way clutch interposed in an annular space between said inner annular body and said outer annular body and brought into a lock state or free state depending on a difference of rotation speed between said inner annular body and said outer annular body so as to transmit a driving power between both said annular bodies and shut down the transmission of the driving power;

a bearing interposed in said annular space and disposed on at least one side in the axial direction of said one-way clutch;

a sealing member for sealing said annular space; and an annular member for hiding said sealing member from outside, said annular member containing a cylindrical portion to be fit into a larger diameter bolt insertion hole of said inner annular body and an annular portion extending from an outer end in the axial direction of said cylindrical portion outward in the diameter direction, said annular portion extending outward in the diameter direction being disposed so as to oppose said sealing member via a minute gap in the axial direction.

* * * * *